Dec. 5, 1950 J. H. BREWER ET AL 2,533,088
PETRI DISH COVER
Filed April 26, 1949

INVENTOR.
John H. Brewer and
Theodore J. Carski
by
Pierce, Scheffler + Parker
their attys Patented Dec. 5, 1950

2,533,088

UNITED STATES PATENT OFFICE 2,533,088

PETRI DISH COVER

John H. Brewer and Theodore J. Carski, Baltimore, Md., assignors to Baltimore Biological Laboratory, Baltimore, Md., a corporation of Maryland Application April 26, 1949, Serial No. 89,731

10 Claims. (Cl. 195—139)

The most commonly used Petri dish is a glass dish having a substantially flat circular bottom about 100 mm. in diameter with a substantially vertical rim about 15 mm. high and a glass cover of the same shape but sufficiently larger in diameter to fit easily over the dish.

Such a dish has a number of disadvantages among which are (1) the cover is fragile and is frequently dropped and broken, (2) the cover does not tightly fit the edge of the rim of the dish and permits airborne contamination of the contents of the dish, (3) the cover sweats and permits or causes spreading and fusing of the colonies of the organism being grown in the dish, and (4) the cover is not readily marked and does not securely retain any removable mark such as wax crayon applied to it.

One of these disadvantages is overcome by the provision of a ceramic cover which may be glazed on its outer surface but unglazed on its inner surface. Such a cover is useful for preventing the spreading of colonies due to sweating because the unglazed ceramic surface absorbs any moisture which condenses on it but the ceramic cover has disadvantages, as compared to the glass cover, in that it is expensive, breaks readily and is more difficult to sterilize.

We have found that many of the disadvantages of the glass and ceramic covers are avoided by the provision of a cover formed of two separable parts, i. e. a support formed of a strong, nonporous and preferably non-fragile material such as metal, e. g. aluminum, copper, brass, stainless steel, etc. or synthetic resin or even of glass and a disposable liner of paper, cardboard or the like. Such a cover does not sweat so as to cause spreading of the colonies, is not fragile, fits the rim of the dish more tightly than the glass and ceramic covers, is readily marked by the means most commonly available, i. e. pencil or ink, and is inexpensive and easy to sterilize.

Figure 1:
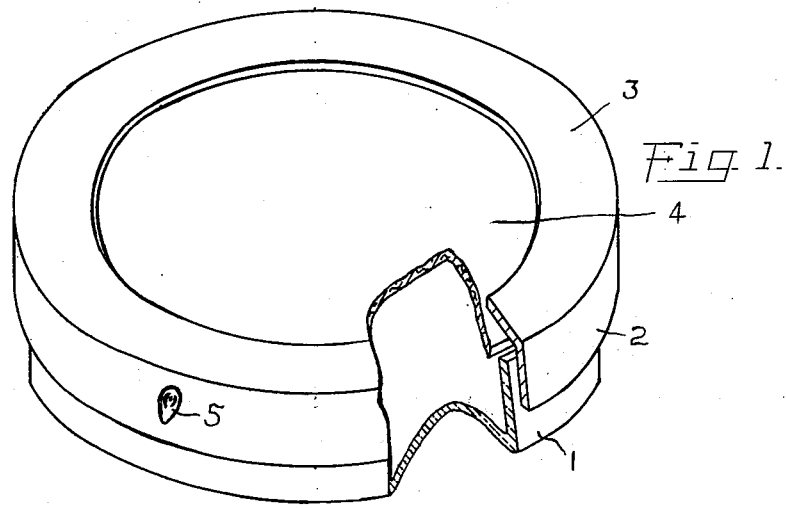
Figure 2:
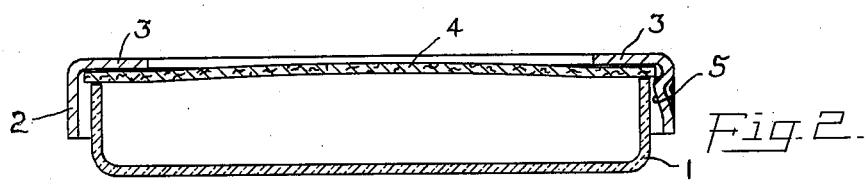
Figure 3:
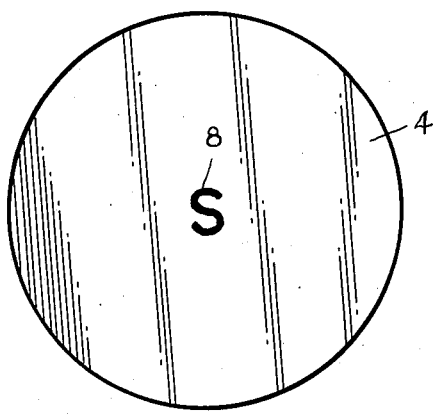
Figure 4:
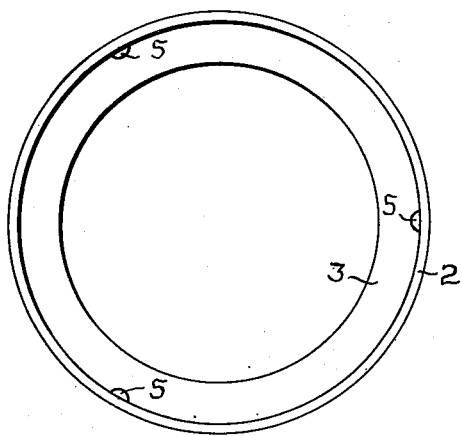
Figure 5:
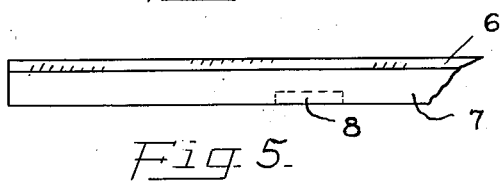

An embodiment of our invention is illustrated in the accompanying drawings in which:

Fig. 1 is a perspective view of a Petri dish and cover with a portion broken away better to show the relationship of the parts, Fig. 2 is a central vertical cross-section of the dish and cover, Fig. 3 is a plan view of the disposable liner, Fig. 4 is a bottom plan view of the cover support, and Fig. 5 is an enlarged section of the disposable liner.

Referring to the drawings, 1 is the conventional glass Petri dish, 2 is the flange and 3 is the circular top portion of the cover support, preferably formed of metal such as aluminum or stainless steel and 4 is the disposable liner, preferably formed of heavy paper or cardboard. The cover support, as stated, is formed of any suitable material, preferably non-porous and non-fragile and relatively non-corrodable such as metal, and as illustrated consists of the flange or skirt portion 2 and the annular top portion 3 at substantially right angles to each other. The flange 2 may flare outwardly slightly so as to facilitate fitting the cover on to the dish. The cover support preferably is sufficiently large in diameter and the liner 4 also sufficiently large that the latter will be positioned and rest on the edge of the dish. The liner 4 may be held in the support by friction only, i. e. by contact of the edges of the liner 4 with the flange 2 but I prefer to provide the projections 5 for positively holding the liner 4 in position within the support. The projections 5 preferably are wedge-shaped as shown in Fig. 2 to facilitate the insertion of the liner 4 and to position it snugly against the top 3. The projections 5 may be formed in any suitable way but when the support is formed of metal the projections 5 conveniently are formed by indenting the flange 2 as appears in Figs. 1 and 2.

Otherwise, in the case of a metal support the projections 5 may be provided by depositing a drop of solder or welding metal on the flange 2 or by welding or gluing a separately formed body to the flange. In the case of a synthetic resin or glass support the projections may be formed by molding when the support is formed. It is advisable to provide three or more projections. Or, as is apparent, a continuous or discontinuous bead might be provided as a substitute for the projections 5 to hold the liner 4 in the support. Or, the inner surface of the flange may be roughened or otherwise treated so as to insure that a liner placed in the support will not fall out.

The liner 4, as stated, is formed of paper, cardboard, or the like and preferably has a smooth, impervious upper surface or layer 6 and a porous lower layer 7. Such cardboard having one smooth coated and calendered or lacquered surface and the other surface uncoated and porous is an article of commerce and need not be further described.

As stated above, the paper or cardboard liner has the advantages that it is not breakable, is inexpensive and disposable, may be sterilized by heat, is readily marked upon, does not sweat and finally, it may be used to indicate the nature of the organism being grown in the Petri dish by marking it with chemical reagents which respond by a change in color to gases which may be generated in the Petri dish. For example, the liner may be marked at 8 with the letter S in lead acetate to show the presence of sulfur or sulfur compounds in the atmosphere in the Petri dish, the marking turning black due to the formation of lead sulfide if sulfur (hydrogen sulfide) is present. Other reagents may be used to indicate the presence of other gases in the Petri dish as is well-known to bacteriologists and of course the liner may be prepared with a plurality of such reagents to indicate the presence of any one or more of a plurality of gaseous products of the colony growth.

The liner also may be impregnated with a water-absorbing material such as glycerol to attract and hold moisture. Other uses for the porous absorbent character of the liner no doubt will be thought of by the user thereof. As stated above, the compressibility and flexibility of the liner causes it to fit the Petri dish rim more tightly than the average glass or ceramic cover because the latter as well as the rim of the dish generally have slight irregularities which prevent a tight fit.

After a cover has been used the liner 4 is removed from the support and discarded and a new sterilized liner inserted in the support. It generally is not necessary to sterilize the support because it does not come in contact with the dish or its contents. The used liners may be saved with their markings to provide a temporary or permanent record of the Petri dish operation.

It is not necessary to make the support in the form of an annulus having flange and annular top portions 2 and 3 of about the same width as illustrated. The top portion 3 may be narrower if desired and merely sufficient to prevent the liner from passing through the support or the annular top part 3 may be widened to any desired extent so as to leave an opening in the top of the support of any desired size. As is also apparent the opening in the support surrounded by the annular part 3 may be of any desired shape, i. e. circular as illustrated or rectangular, etc. or the top of the support may be completely closed so that the support has the same shape as the conventional Petri dish cover with the projections 5 or their equivalents in the flange 2 for supporting the liner 4 in position. As will be apparent, an opening through the support top facilitates the removal of a used liner whereas when the support is in the form of a closed cover it may be necessary to remove a used liner by means of a sharp tool capable of penetrating into the liner to lift it out of the support or to provide means such as a tab on the liner, e. g. like that on the conventional milk bottle cap to facilitate its removal from the support.

We claim:

1. A Petri dish cover comprising a support having a top portion and an integral flange portion at substantially right angles to each other and a liner of flexible, disposable, absorbent material detachably secured in said support with its edge in contact with the flange portion adjacent its junction with the top portion.

2. A Petri dish cover as defined in claim 1 in which the support is formed of a non-porous and non-fragile material.

3. A Petri dish cover is defined in claim 1 in which the flange portion of the support is provided with an inwardly extending projection adjacent to but spaced apart from the top portion for releasably securing the liner in position.

4. A Petri dish cover as defined in claim 1 in which the support is formed of a relatively non-corrodable metal and in which the flange thereof has a plurality of integral inwardly extending projections adjacent to but spaced apart from the top portion thereof for releasably securing the liner in position.

5. A Petri dish cover as defined in claim 1 in which the liner is formed of a sheet of non-woven fabric.

6. A Petri dish cover as defined in claim 1 in which the liner is formed of paper.

7. A Petri dish cover as defined in claim 1 in which the liner is formed of cardboard having an impervious upper surface and a porous lower surface.

8. A Petri dish cover as defined in claim 1 in which the liner is formed of a non-woven fabric and is provided with a deposit of a chemical indicator.

9. A Petri dish cover as defined in claim 1 in which the top of the support is annular.

10. A Petri dish cover as defined in claim 1 in which the top of the support is provided with an opening.

JOHN H. BREWER.
THEODORE J. CARSKI.

REFERENCES CITED

The following references are of record in the file of this patent:

UNITED STATES PATENTS

| Number | Name | Date |
| --- | --- | --- |
| 2,144,255 | Carpenter | Jan. 17, 1939 |
| 2,279,991 | Hotchkiss | Apr. 14, 1942 |
| 2,348,448 | Brewer | May 9, 1944 |
| 2,361,992 | Cantor | Nov. 7, 1944 |

OTHER REFERENCES

Leviton, Science, June 2, 1944, pages 455-456.